United States Patent
Gauthier et al.

(12) United States Patent (10) Patent No.: US 9,227,581 B1
Gauthier et al. (45) Date of Patent: *Jan. 5, 2016

(54) VEHICLE POWER DISTRIBUTION SYSTEM WITH EXTENDED STORAGE CAPABILITIES

(71) Applicant: Atieva, Inc., Redwood City, CA (US)

(72) Inventors: Jean-Philippe Gauthier, San Francisco, CA (US); Philip R. Graham, Milpitas, CA (US); Richard J. Biskup, Sunnyvale, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,475

(22) Filed: Aug. 19, 2014

Related U.S. Application Data (63) Continuation-in-part of application No. 14/462,885, filed on Aug. 19, 2014.

(51) Int. Cl.
*B60R 16/00* (2006.01)
*B60R 16/03* (2006.01)
*G07C 5/08* (2006.01)

(52) U.S. Cl.
CPC .............. *B60R 16/03* (2013.01); *G07C 5/0808* (2013.01)

(58) Field of Classification Search
CPC ..... B60R 16/03; G07C 5/0808; Y02T 90/128
USPC .......... 701/34.4, 36, 29.1; 307/11, 29, 46, 48; 323/267
See application file for complete search history.

(56) References Cited

U.S. PATENT DOCUMENTS

| | | | | |
|---|---|---|---|---|
| 6,144,110 A | * | 11/2000 | Matsuda .................. | H02J 9/04 307/10.1 |
| 6,762,595 B2 | * | 7/2004 | Tamai ..................... | H02J 9/005 323/266 |
| 2002/0084786 A1 | * | 7/2002 | Egami .................... | B60Q 11/00 324/503 |
| 2014/0375120 A1 | * | 12/2014 | Bissontz ................ | B60L 1/003 307/10.1 |
| 2015/0217640 A1 | * | 8/2015 | Bissontz ................ | B60R 16/03 307/9.1 |

* cited by examiner

*Primary Examiner* — Marthe Marc-Coleman
(74) *Attorney, Agent, or Firm* — Patent Law Office of David G. Beck (57) ABSTRACT

A power distribution module for use in a vehicle's power control system is provided. The power distribution module includes a plurality of control circuits, each of which is under the control of its own circuit switch, and each of which is coupled to one or more electronic control modules. The power distribution module also includes a processor that is configured to close each of the circuit switches, thereby providing power to the corresponding control circuits, in response to current vehicle conditions and in accordance with a preset set of conditions. An extended storage switch, when closed, prevents the power distribution module from electrically connecting any of the control circuits to the power source, thereby allowing parasitic power loss to be reduced to the point where the only loss is due to internal self-discharge.

21 Claims, 6 Drawing Sheets

VEHICLE POWER DISTRIBUTION SYSTEM WITH EXTENDED STORAGE CAPABILITIES

CROSS-REFERENCE TO RELATED APPLICATION

This application is a continuation-in-part of U.S. patent application Ser. No. 14/462,885, filed 19 Aug. 2014, the disclosure of which is incorporated herein by reference for any and all purposes.

FIELD OF THE INVENTION

The present invention relates generally to a vehicle and, more particularly, to a vehicle power distribution system.

BACKGROUND OF THE INVENTION

In a conventional vehicle, the various electronic components and systems are either directly connected to the vehicle's power supply, resulting in a constant drain on the power supply, or activated via a power relay that is controlled by the vehicle's ignition switch. For a two-position ignition switch, the systems coupled to the vehicle's power supply via the ignition switch are all either off or on, and when they are turned on they are activated simultaneously. Many vehicles, however, use a four-position or a five-position ignition switch, thereby allowing the user to activate some of the vehicle's accessory systems without applying power to all of the vehicle's electronic components and systems. In a four-position switch the positions typically correspond to (i) off, (ii) accessories, (iii) on, and (iv) start, while in a five-position switch the positions typically correspond to (i) off, (ii) accessories 1, (iii) accessories 2, (iv) on, and (v) start. Note that the "start" position only relates to vehicles that utilize an internal combustion engine (ICE), and therefore require the use of a starter motor to initiate engine operation. Accessories that may be powered-on when the ignition switch is in an accessory position include internal lights, external lights, power windows, ventilation blower fans, and the vehicle's entertainment system. Always on components and systems, i.e., those systems that are directly connected to the vehicle's power supply and therefore are always in a powered-up state, typically include power door locks, alarm systems, subsystem monitors, and some or all vehicle lights.

While the conventional power system is adequate, it can lead to undesired consequences. For example, when a conventional vehicle is left unattended for an extended period of time such as when the user is away on vacation, the power drain from the directly connected systems can completely drain the battery, thereby leaving the user stranded when they return to their car. Additionally, since those systems that are powered-up by the ignition switch are all turned on at one time, electronic controller diagnostic strategies are often unnecessarily complex. Accordingly, what is needed is a power distribution system that provides more control over the various electronic components and systems of a vehicle during the power-up sequence. The present invention provides such a system.

SUMMARY OF THE INVENTION

The present invention provides a vehicle power control system comprised of (i) a power source, such as a battery pack; (ii) a plurality of control circuits; (iii) a plurality of electronic control units (ECUs), where each of the control circuits is coupled to at least one of the ECUs, and where each of the ECUs is electrically connected to at least one vehicle electrical component of a plurality of vehicle electrical components; (iv) a power distribution module coupled to the power source; and (v) an extended storage switch adjustable between a 'normal operation' position and an 'extended storage' position and which may be comprised of an externally accessible mechanical switch. The power distribution module is comprised of (i) a plurality of control circuit switches, where each control circuit switch is interposed between the power source and a corresponding control circuit, and where each control circuit switch is adjustable between an open position in which the power source is electrically disconnected from the corresponding control circuit and a closed position in which the power source is electrically connected to the corresponding control circuit; (ii) a processor coupled to the plurality of control circuit switches, where the processor controls adjustment of each of the control circuit switches between the open and closed positions, and where the processor is configured to adjust each of the control circuit switches between the open and closed positions based on a set of current vehicle conditions and in accordance with a set of preset switch activation instructions; and (iii) a plurality of sensors coupled to the processor and configured to monitor the set of current vehicle conditions. When the extended storage switch is in the 'normal operation' position the processor adjusts each of the control circuit switches between the open and closed positions based on current vehicle conditions and in accordance with the set of preset switch activation instructions. When the extended storage switch in the 'extended storage' position the processor is prevented from electrically connecting any of the control circuits to the power source, for example by disrupting power to the processor. The vehicle power control system may be further comprised of a plurality of fuses, where at least one of the fuses is integrated into each of the control circuits, and preferably interposed between each of the control circuits and the corresponding ECU(s).

In one aspect, the vehicle power control system may further comprise a vehicle power switch adjustable between an 'on' position and an 'off' position, where the status of the vehicle power switch is included in the set of current vehicle conditions monitored by the plurality of sensors, and where the processor is configured to close at least a subset of the plurality of control circuit switches in response to the status of the vehicle power switch shifting from the 'off' position to the 'on' position. The processor may close the subset of the plurality of control circuit switches sequentially.

In another aspect, a first control circuit of the plurality of control circuits may be electrically connected to a set of vehicle passenger safety systems (e.g., an airbag control module); the set of current vehicle conditions may include current vehicle speed, where the plurality of sensors monitors current vehicle speed; and the processor, in response to the set of preset switch activation instructions, may be configured to close the first control circuit switch, corresponding to the first control circuit, when the speed is greater than a preset value. The vehicle power control system may further comprise a vehicle power switch adjustable between an 'on' position and an 'off' position, where the status of the vehicle power switch is included in the set of current vehicle conditions monitored by the plurality of sensors, and where the processor is configured to close the first control circuit switch when the status of the vehicle power switch shifts from the 'off' position to the 'on' position.

In another aspect, a first control circuit of the plurality of control circuits may be electrically connected to a set of vehicle lights and a set of door latches; the set of current vehicle conditions may include current vehicle fault status, where the plurality of sensors monitors current vehicle fault status; and the processor, in response to the set of preset switch activation instructions, may be configured to maintain the first control circuit switch, corresponding to the first control circuit, in a closed position unless a vehicle fault is detected by the plurality of sensors in which case the processor opens the first control circuit switch in response to the set of preset switch activation instructions. Additionally, a second control circuit, controlled by a second control circuit switch, may be electrically connected to a primary DC/DC converter and a third control circuit, controlled by a third control circuit switch, may be electrically connected to a secondary DC/DC converter, where the processor maintains the third control switch in a closed position when the first control circuit switch is in the closed position, and opens the third control switch if the second control circuit switch is in the closed position when the first control circuit switch is in the closed position.

In another aspect, a first control circuit of the plurality of control circuits may be electrically connected to at least one vehicle propulsion system and the vehicle power control system may further comprise a vehicle power switch adjustable between an 'on' position and an 'off' position, where the status of the vehicle power switch is included in the set of current vehicle conditions monitored by the plurality of sensors, and where in response to the preset switch activation instructions the processor closes a first control circuit switch corresponding to the first control circuit when the status of the vehicle power switch shifts from the 'off' position to the 'on' position and then opens the first control switch when the status of the vehicle power switch shifts from the 'on' position to the 'off' position.

In another aspect, a first control circuit of the plurality of control circuits may be electrically connected to a set of passenger convenience systems (e.g., passenger cabin HVAC module, power window control module, vehicle entertainment module, etc.) and the vehicle power control system may further comprise a vehicle power switch adjustable between an 'on' position and an 'off' position, where the status of the vehicle power switch is included in the set of current vehicle conditions monitored by the plurality of sensors, and where in response to the preset switch activation instructions the processor closes a first control circuit switch corresponding to the first control circuit when the status of the vehicle power switch shifts from the 'off' position to the 'on' position and then opens the first control switch when the status of the vehicle power switch shifts from the 'on' position to the 'off' position and after the conclusion of a preset delay period. The preset delay period may be user settable via a vehicle user interface. Furthermore, in response to the set of preset switch activation instructions, after the vehicle power switch shifts from the 'on' position to the 'off' position, if a vehicle door is opened the preset delay period is terminated and the processor immediately opens the first control switch.

In another aspect, a first control circuit of the plurality of control circuits may be electrically connected to a vehicle thermal management system; the vehicle power control system may further comprise a vehicle power switch adjustable between an 'on' position and an 'off' position, where the status of the vehicle power switch is included in the set of current vehicle conditions monitored by the plurality of sensors; and the processor, in response to the set of preset switch activation instructions, may be configured to close the first control circuit switch, corresponding to the first control circuit, when the status of the vehicle power switch shifts from the 'off' position to the 'on' position. The set of current vehicle conditions may further comprise a current vehicle battery pack temperature, where the plurality of sensors monitors the current vehicle battery pack temperature, and where the processor is configured to compare the current vehicle battery pack temperature to a preset temperature range and, in response to the set of preset switch activation instructions, close the first control circuit switch when the current vehicle battery pack temperature falls outside of the preset temperature range.

In another aspect, the plurality of sensors may monitor current power usage per control circuit and the processor may be configured to display a representation of the current power usage per control circuit on a user interface mounted within the vehicle's passenger cabin. The representation of the current power usage for a given control circuit may be displayed in terms of a percentage of the maximum usage limit for that particular control circuit, or in terms of the actual power usage for that particular control circuit.

In another aspect, the vehicle power control system may further comprise a diagnostic system coupled to the processor, where the diagnostic system monitors the current and voltage at multiple locations within each particular control circuit, and where the processor is configured to determine for each particular control circuit whether power is being supplied to the ECU(s) coupled to that control circuit when the corresponding control circuit switch is closed.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure.

In the following text, the terms "battery", "cell", and "battery cell" may be used interchangeably and refer to a complete battery with two output terminals, electrodes and an electrolyte utilizing any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" refers to a group of batteries, or to multiple battery modules, that are electrically interconnected to achieve the desired battery pack voltage and capacity. The term "battery pack enclosure" refers to an enclosure containing a battery pack. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
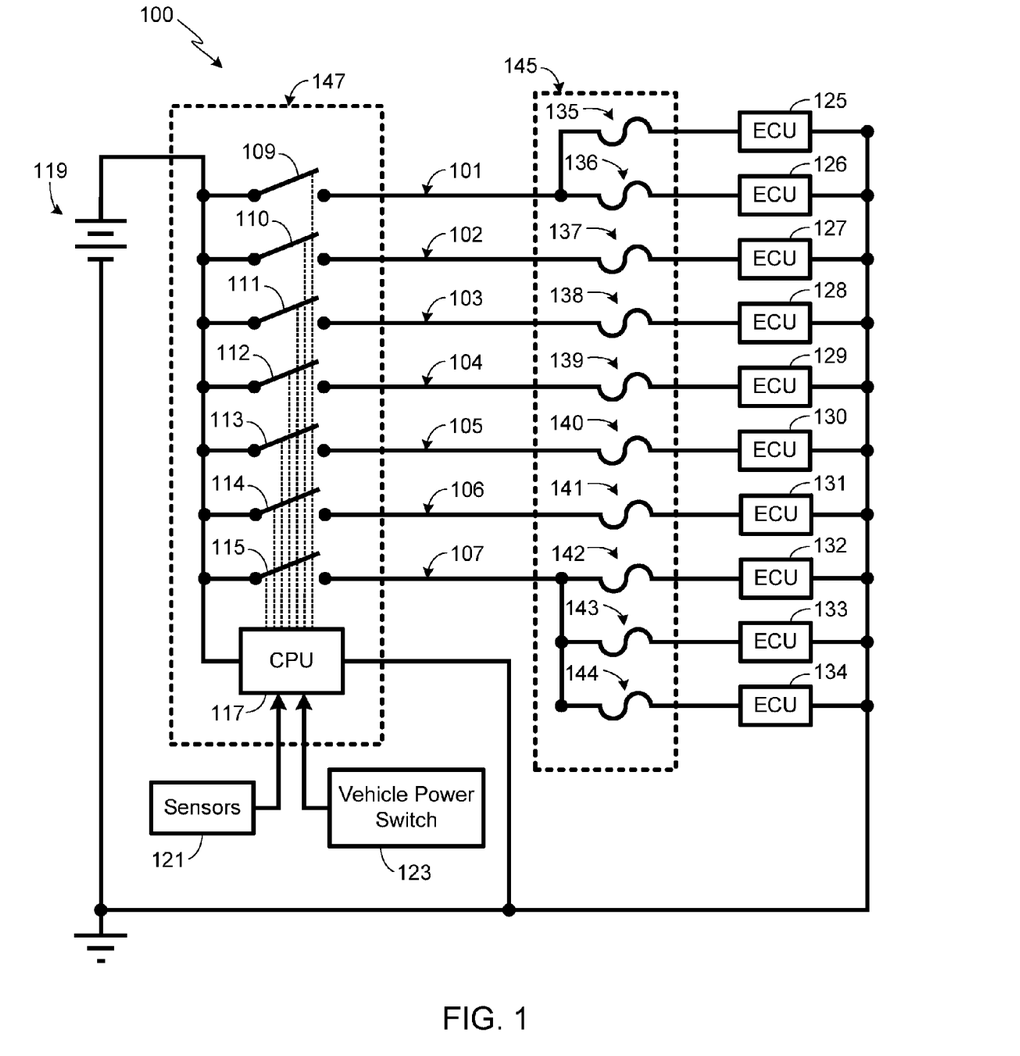
FIG. 1 is a schematic diagram of a vehicle power distribution system in accordance with the present invention.

FIG. 1 provides a schematic illustration of a vehicle power control system 100 in accordance with the invention. Power control system 100 may be used with any vehicle that could benefit from an improved power control system such as a conventional vehicle powered by an internal combustion engine (i.e., an ICE vehicle), a hybrid-powered vehicle, or an all-electric vehicle. System 100 includes multiple control circuits 101-107, each of which is under the control of its own circuit switch, specifically control circuit switches 109-115, respectively. It should be understood that system 100 is not limited to a specific number of control circuits, and the number of control circuits shown in FIG. 1, as well as the component(s) and/or subsystem(s) associated with each and described in detail below, are only meant for illustration and are not intended to limit the scope of the invention. As described in detail below, the use of the present power distribution system provides additional control over the vehicle's electric components and subsystems, while helping to minimize parasitic battery losses.

Each switch 109-115 is under the control of processor 117, also referred to herein as a controller. Processor 117 is typically comprised of a microprocessor or a programmable logic device. Preferably processor 117 is a stand-alone controller as shown, thereby helping to minimize parasitic losses when the car is parked and in an 'off' state. In some embodiments, however, processor 117 is integrated into another vehicle control system, for example the vehicle's management system. In the preferred system shown in FIG. 1, processor 117 is always connected to power source 119, where the power source is typically comprised of the vehicle's battery or battery pack.

Processor 117 is configured to close switches 109-115, and thus provide power to control circuits 101-107, in response to current conditions as monitored by a set of sensors 121. The conditions monitored by sensors 121 may be communicated directly to processor 117, or communicated via a communication bus as preferred. The communication bus may consist of a computer backplane, a board bus, an on-chip bus within an integrated circuit, a local area network or LAN, a wide area network or WAN, or other type of bus, that allows data signals to be transferred between the various components and/or devices that comprise the system and processor 117. In the preferred embodiment, sensor data is communicated to processor 117 via a controller area network, or CAN, bus. The CAN bus, which is commonly used in the automotive industry, is a multi-master broadcast serial bus that may be implemented using balanced pair signals in twisted-pair wires, optionally in shielded cables.

Also communicated to processor 117 is the operational status of the vehicle, i.e., whether the vehicle is currently 'on' or 'off'. While this information may be monitored by one of the sensors 121, for clarity in the illustration a separate power switch 123 is shown. The status of power switch 123 may be communicated directly to processor 117, or communicated via a communication bus (e.g., CAN, LAN, WAN, board bus, etc.) as described above relative to sensors 121. Switch 123 may be controlled by any of a variety of techniques, for example by turning the ignition key to the 'on' position; alternately, switch 123 may be closed when the vehicle is turned on by pressing an 'on' button that is located on the dash, center console, or elsewhere; alternately, switch 123 may be closed when the driver activates the car by sitting in the driver's seat; alternately, switch 123 may be closed when the driver activates the car using a fingerprint sensor; alternately, switch 123 may be closed when a proximity sensor integrated into the vehicle recognizes an authorized key fob that has an integrated ID tag and that is currently located within a preset distance from the proximity sensor; alternately, switch 123 may be closed when a facial recognition system integrated into the vehicle recognizes an authorized driver sitting in the driver's seat; alternately, switch 123 may be closed when a voice recognition system integrated into the vehicle recognizes a specific auditory command or password. It will be appreciated that other techniques may be used to close switch 123 and initiate the vehicle's start-up sequence.

Processor 117 is programmed to close each switch 109-115 in accordance with a preset set of conditions. Accordingly, some of the control circuits 101-107 may be powered-up even when the car is parked and in the 'off' state. With respect to those switches that are closed when the vehicle is turned 'on', preferably processor 117 is configured to close the affected switches sequentially, or in groups, rather than simultaneously.

When a controller switch 109-115 is closed, the corresponding control circuit 101-107, respectively, is coupled to power source 119. Each control circuit 101-107 connects power source 119 to one or more electronic control units (ECU) 125-134. Once power is coupled to an ECU 125-134, the corresponding ECU provides power to the component or components coupled to that particular ECU. Note that multiple ECUs may be coupled to the same control circuit. For example, in the illustrated embodiment two ECUs, i.e., ECUs 125 and 126, are simultaneously provided power by the closure of switch 109; and three ECUs, i.e., ECUs 132-134, are simultaneously provided power by the closure of switch 115. In this exemplary embodiment, a single ECU is coupled to each control circuit 102-106.

In system 100, interposed between each ECU 125-134 and power source 119 is a fuse 135-144, respectively. Preferably the fuses 135-144 are housed within a fuse box 145, thereby providing easy access when a fuse requires replacement.

As previously described, controller 117 of power distribution module 147 may be configured to only close a specific control circuit switch 109-115 when a specific condition, or a specific set of conditions, is met. Exemplary conditions are described below, although it should be understood that these conditions are only meant to illustrate the invention, and that different conditions may be utilized by processor 117 to determine when to close the control circuit switches.

In at least one configuration of system 100, one of the control circuits (e.g., control circuit 101) provides power to those components and systems that are relevant to passenger safety and therefore should be operational whenever the vehicle is in motion. Examples of such components and systems may include, but are not limited to, the airbag control module, the electric power steering, the ABS system and the brake booster vacuum pump. These various components and systems may be coupled to power source 119 via a single ECU, or multiple ECUs as shown. This control circuit is initialized when vehicle power switch 123 is closed, although as noted above there may be a slight initiation delay if processor 117 is configured to sequentially close the control circuit switches. Since the components and systems powered by control circuit 101 are those required to maintain vehicle occupant safety, processor 117 also closes switch 109, thereby providing power to control circuit 101, whenever sensors 121 determine that the vehicle is traveling at a speed greater than a preset speed, e.g., 1 mph, regardless of whether or not switch 123 is closed. Therefore even if the car does not appear to be 'on' based on the status of switch 123, the vehicle's occupants are still safe when the car is in motion. It will be appreciated that various types of information such as wheel rotation and/or changes in vehicle position as determined using a global positioning system may be used by sensors 121 to determine vehicle motion.

Figure 2:
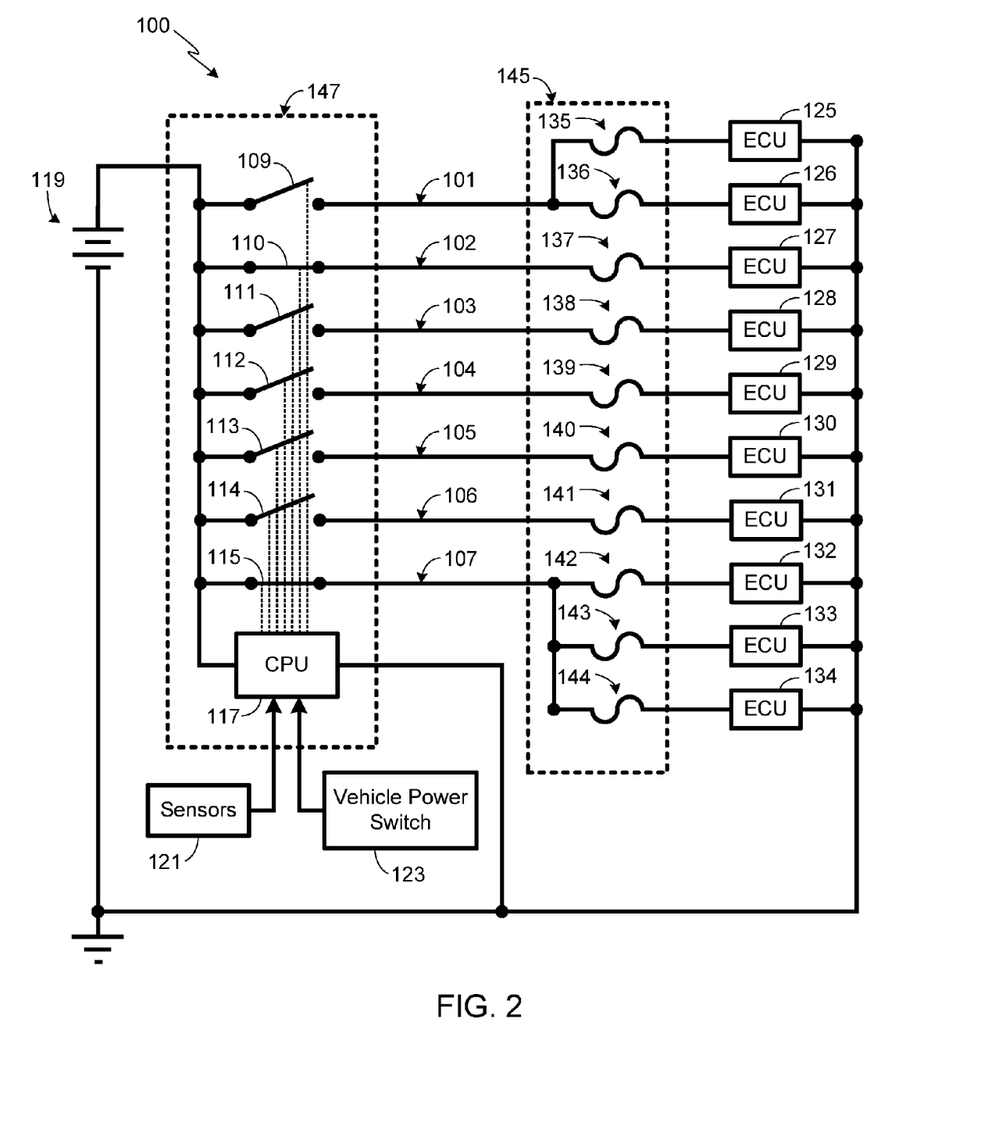
FIG. 2 is a schematic diagram of the vehicle power distribution system shown in FIG. 1 as configured when the vehicle is 'off'.

In at least one configuration of system 100, one of the control circuits (e.g., control circuit 102) provides power to those components and systems that are typically left in a powered-up state regardless of whether or not the vehicle is 'on' as determined by switch 123. Examples of such components and systems may include, but are not limited to, brake lights, hazard lights, interior lights, remotely operated door and trunk latches, and the interior power outlet. These various components and systems may be coupled to power source 119 via multiple ECUs or a single ECU as shown. Preferably processor 117 is configured to open switch 110 upon the occurrence of a serious vehicle problem or malfunction detected by sensors 121, for example the output from power source 119 falling below a preset value (e.g., 8 volts). Accordingly, under normal operating conditions switch 110 is closed as shown in FIG. 2.

In at least one configuration of system 100, one of the control circuits (e.g., control circuit 103) provides power to those components and systems that are utilized by the vehicle's propulsion system. Exemplary components and systems powered by control circuit 103 may include the engine controller for an ICE-based vehicle, and the motor/inverter controller for an all-electric vehicle. As it is important for the driver to be able to turn on or turn off the vehicle in a traditional manner, processor 117 closes switch 111 whenever vehicle switch 123 is in the 'on' state, and opens switch 111 whenever vehicle switch 123 is in the 'off' state.

In at least one configuration of system 100, one of the control circuits (e.g., control circuit 104) provides power to those components and systems that are utilized by vehicle's occupants for their comfort. Examples of such components and systems may include, but are not limited to, the passenger cabin heating, ventilation and air conditioning (HVAC) system, the power windows, the power sunroof/moon roof, and the vehicle's entertainment system. This control circuit is initialized when vehicle power switch 123 is closed, although as noted above there may be a slight initiation delay if processor 117 is configured to sequentially close the control circuit switches. Since the components and systems powered by control circuit 104 may be generally categorized as comfort amenities, it is often desirable to allow these features to continue to operate, at least for a limited time, after the car has been turned off via power switch 123. Accordingly, in the preferred embodiment once control circuit switch 112 is closed, it remains closed even after the vehicle is turned off as long as the driver's door remains closed. Once the driver's door is opened, processor 117 opens switch 112, thereby terminating the connection between power source 119 and control circuit 104. In an alternate embodiment, once control circuit 104 is powered-up, it remains on for a preset period of time (e.g., 2 minutes, 5 minutes, etc.) after the vehicle is turned off as long as the driver's door remains closed. Once the preset time period has passed, or if the driver's door is opened, processor 117 opens switch 112 and terminates the circuit's connection to power source 119. The system may be configured to allow the time period applied to circuit 104 to be preset by the manufacturer, by the user, or by a third party.

In at least one configuration of system 100, one of the control circuits (e.g., control circuit 105) provides power to the vehicle's primary thermal management systems, for example the battery thermal management system in an EV, or the motor cooling system in an ICE-based vehicle. This control circuit is initialized when vehicle power switch 123 is closed, although as noted above there may be a slight initiation delay if processor 117 is configured to sequentially close the control circuit switches. Since the components and systems powered by control circuit 105 are those required to properly operate the vehicle's primary thermal management systems, and therefore maintain critical systems such as the battery pack within the desired temperature range, processor 117 also closes switch 113 whenever the monitored temperature of the affected system, for example the battery pack in an EV, is greater than a preset temperature, regardless of whether or not switch 123 is closed. In some configurations, processor 117 is configured to close switch 113 whenever sensors 121 detect that the temperature of the affected system is less than a preset temperature, thereby allowing the thermal management system coupled to control circuit 105 to heat the affected system as necessary. In yet other configurations, processor 117 is configured to close switch 113 whenever it is determined that the temperature of the affected system is increasing, or decreasing, at a rate greater than a preset value.

In at least one configuration of system 100, one of the control circuits (e.g., control circuit 106) provides power to an EV's primary DC/DC converter. As such, this control circuit is powered-up whenever one of the primary components and/or systems that requires DC power is powered-up, or when power source 119 needs to be recharged. Accordingly, processor 117 closes switch 114, thereby providing power to control circuit 106, whenever control circuit 101 is powered-up; or whenever control circuit 103 is powered-up; or whenever control circuit 104 is powered-up; or whenever control circuit 105 is powered-up.

Figure 3:
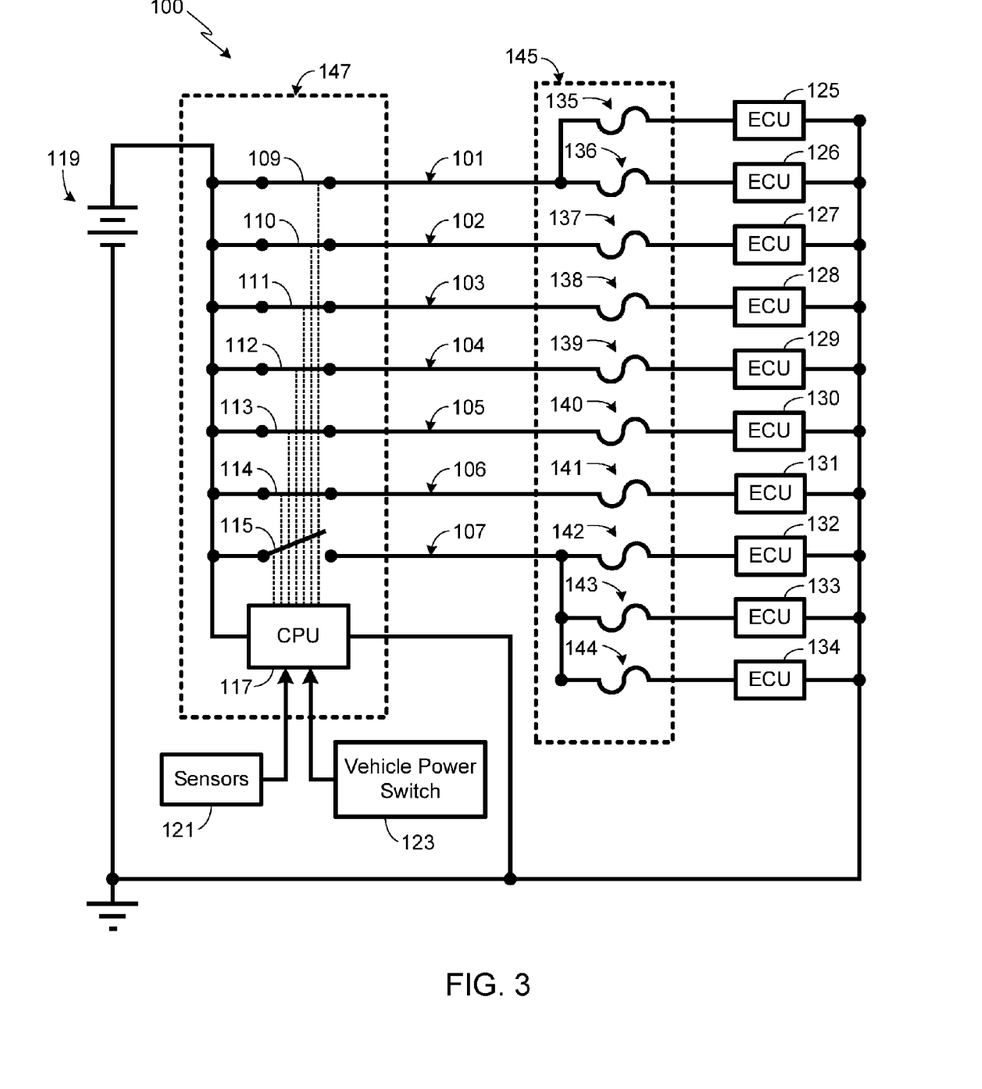
FIG. 3 is a schematic diagram of the vehicle power distribution system shown in FIG. 1 as configured when the vehicle is 'on'.

In at least one configuration of system 100, one of the control circuits (e.g., control circuit 107) provides power to a secondary DC/DC converter, where the secondary DC/DC converter is smaller and more efficient than the primary DC/DC converter coupled to control circuit 106. Processor 117 closes switch 115, thereby connecting the secondary DC/DC converter to power source 119, whenever switch 110 is closed and switch 114 is open as illustrated in FIG. 2. Note that FIG. 3 illustrates this embodiment during normal vehicle operation, i.e., when control circuits 101-106 are powered up, and switch 115 corresponding to control circuit 107 is open.

Extended Storage

As vehicles become more sophisticated and rely more heavily on the operation of a variety of electronic subsystems, the parasitic losses that occur when a car is in storage, even if only for a short time, are becoming increasingly problematic. For example, when returning from a long vacation the owner of an ICE-based vehicle may find that their car has insufficient charge due to the parasitic losses to even start. Similarly, the owner of an electric car may find that the loss of driving range due to the parasitic losses is not only annoying, but in some instances may even prevent the driver from reaching their next intended charging station.

Figure 4:
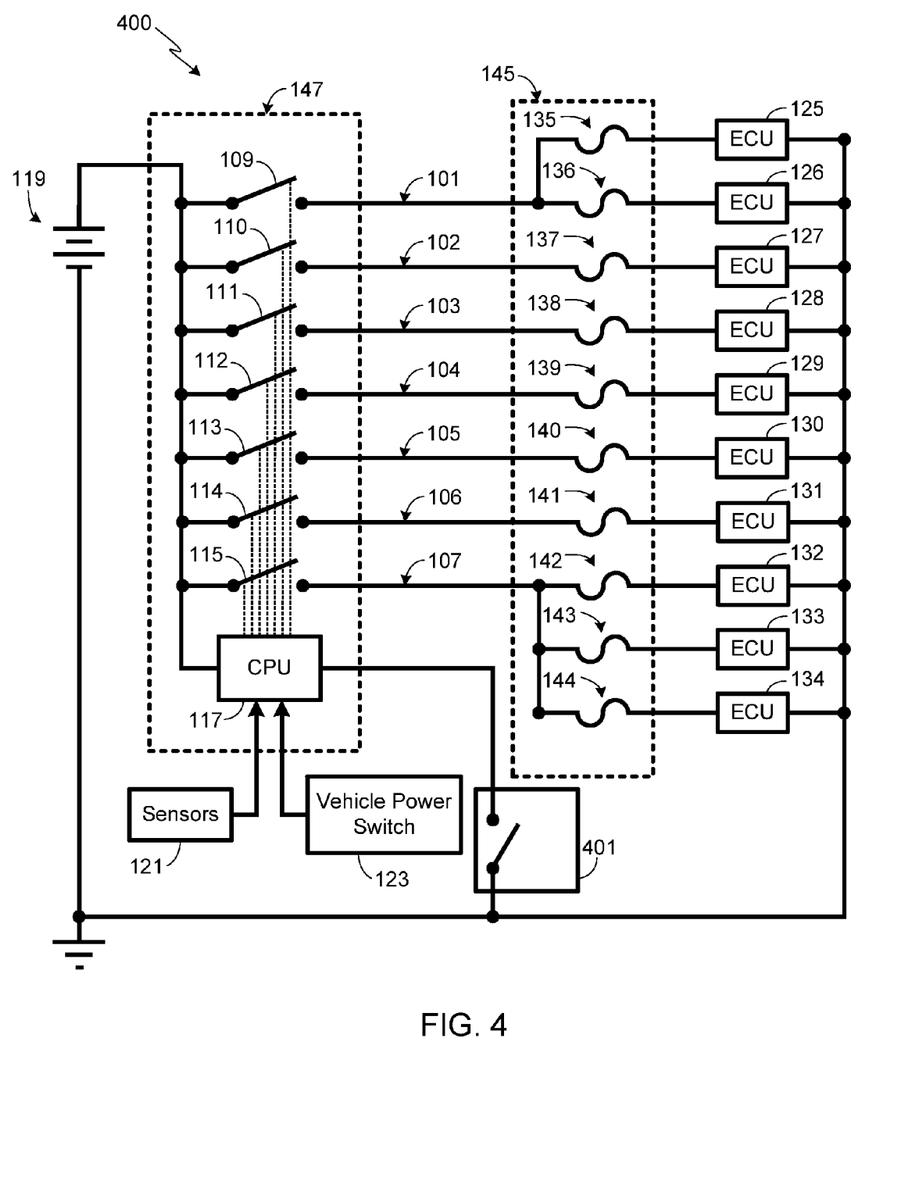
FIG. 4 is a schematic diagram of the vehicle power distribution system shown in FIG. 1 modified to include an extended storage feature.

FIG. 4 illustrates a modification of the disclosed power distribution system that allows the user to temporarily disrupt all of the power control circuits in the power distribution module 147. As shown, when the extended storage switch 401 is activated, i.e., is placed into an 'open' position, the power to controller 117 is disrupted as is the power to each of the control circuits operated by controller 117. As a result, power loss can be reduced to the point where the only loss is due to internal self-discharge, assuming that all circuits and systems that are coupled to power source 119 are controlled by processor 117 and the power distribution module 147. Note that extended storage switch 401 may be a mechanical switch, for example a mechanical switch accessible from the outside of the vehicle, or any other type of switch that allows disruption of the power distribution module as shown.

Power Distribution Feedback System

The combination of growing concern over global warming and increasing fuel cost has caused many people to do everything within their power to maximize vehicle operating efficiency, including replacing inefficient vehicles with high mileage hybrids or all-electric cars. Even with an efficient vehicle, it is still possible to significantly affect operating efficiency using any of a variety of techniques. These techniques include (i) altering driving style (e.g., maintaining an efficient speed, proper gear choice, efficient acceleration and deceleration, etc.); (ii) maintaining an efficient vehicle (e.g., proper tire pressure, use of low rolling resistance tires, minimizing aerodynamic losses due to bike racks and similar accessories, etc.); and (iii) minimizing ancillary losses (e.g., operation of air conditioning, entertainment system, etc.). In an all-electric car, ancillary losses are of particular concern since any vehicle component or system that adds a drain on the battery pack will directly impact the vehicle's driving range.

The manufacturers of hybrid vehicles, recognizing that many of their buyers are trying to maximize vehicle efficiency, routinely include displays that provide the driver with real-time feedback regarding the car's current operating efficiency. Typically operating efficiency is provided to the driver in terms of a current miles-per-gallon (MPG) rating. The present inventors, recognizing that providing efficiency feedback directly to a driver incentivizes that driver to improve their car's operating efficiency, utilize the present power distribution module to monitor particular control circuits and provide power usage information for those control circuits to the driver. Power usage data may be presented in a variety of ways, for example graphically (e.g., using a bar chart) or digitally (e.g., using current power usage in kWh). This data may be presented within the instrument cluster, for example utilizing a small display screen, or presented on a primary display interface, for example on the navigation screen, or presented in a heads-up display (HUD). Preferably this data is only presented to the user when requested. For example, this data screen may be one of many data screens from which the user can select, typically using a toggling switch or similar means. Other data screens may include tire pressure data, current range, current ambient temperature, etc.

Figure 5:
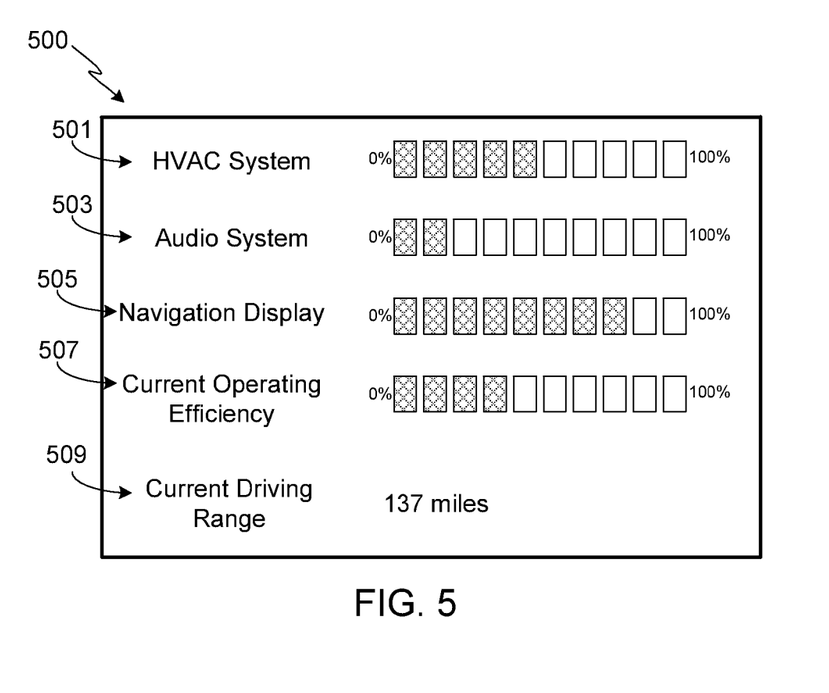
FIG. 5 illustrates a data screen that provides the driver with power usage information for several ancillary systems controlled by the power distribution system of the invention.

In one embodiment, only power usage data for those control circuits over which the driver has direct control are presented to the driver. A data screen 500 illustrating this embodiment is shown in FIG. 5. In the illustrated embodiment, power usage for the HVAC system (501), the audio system (503) and the navigation display (505) are provided, although it will be appreciated that other systems may be presented in power usage display screen 500. Although the information may be presented in terms of kWh, in display screen 500 the power usage data is given in terms of a percentage of the particular system's theoretical limit, i.e., 0% for non-use and 100% if operating at the system's maximum setting. Thus in the exemplary screen, the HVAC system 501 is operating at 50% of its theoretical limit, the audio system 503 is operating at 20% of its theoretical limit, and the navigation system 505 is operating at 80% of its theoretical limit. By providing the information in terms of a percentage of each system's theoretical operating limit, the user is able to easily visualize the differences that they may make by altering a system setting, e.g., altering the display screen brightness in navigation system 505, or changing the temperature setting for the HVAC system 501. Preferably a metric(s) is also provided that allows the driver to visualize the difference that a change in an individual system (e.g., HVAC system 501) may have on the vehicle's overall efficiency 507. In the illustrated screen, in addition to providing the current operating efficiency 507 of the vehicle, the current driving range 509 is also provided, thereby giving the driver yet another way in which to gauge the effect that a change in the operation of an ancillary system may have on the vehicle.

Power Distribution Diagnostic System

In a conventional vehicle it is often quite difficult and time consuming to determine the actual location of a problem (e.g., a short) within the vehicle's electrical system. This difficulty typically arises due to the use of a relatively simple electrical distribution system to provide power to a wide range of complex and divergent electrical components and systems. Even if the problematic component is separately fused and that fuse is blown, it is generally necessary to check, at least visually, each fuse to determine which fuse is blown.

Figure 6:
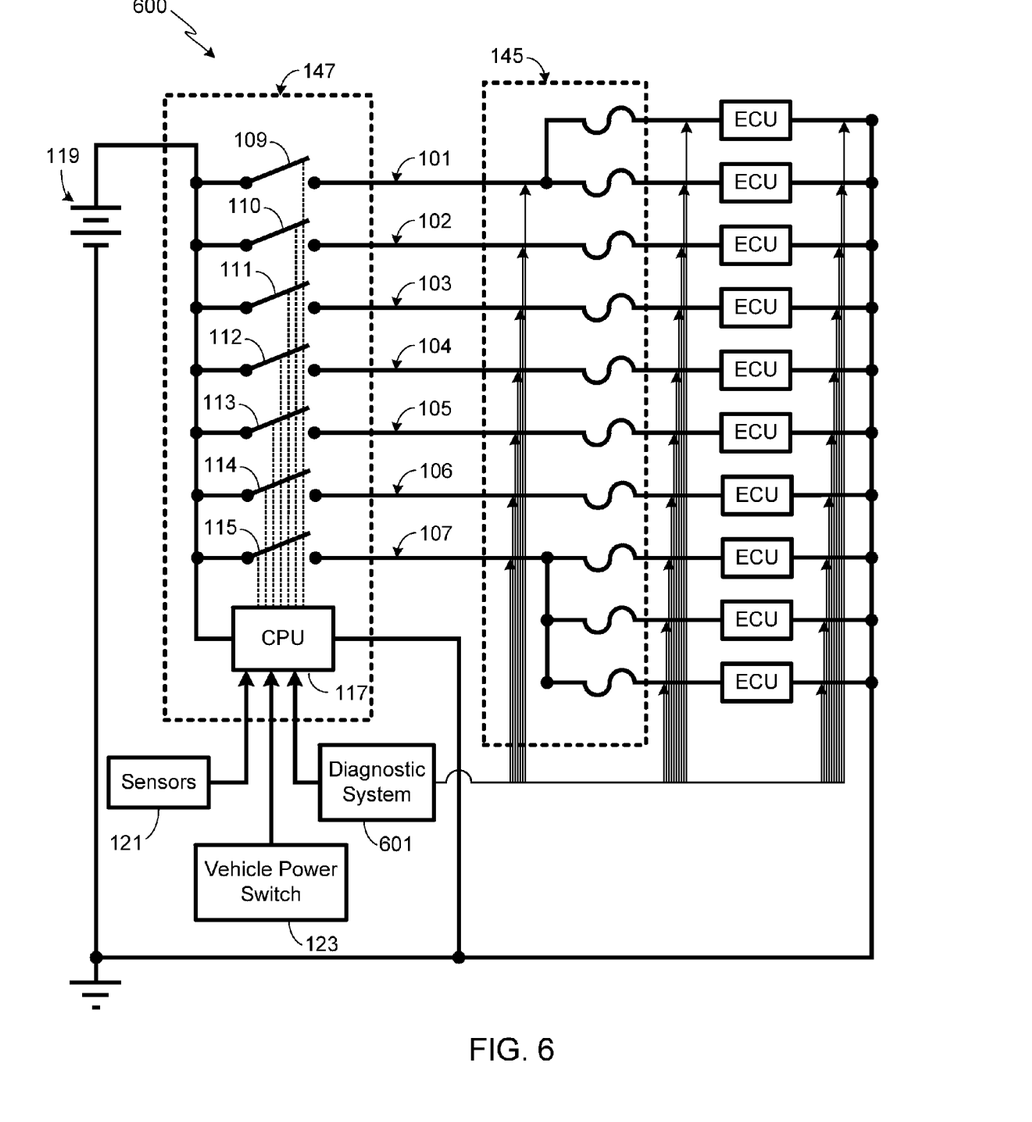
FIG. 6 is a schematic diagram of the vehicle power distribution system shown in FIG. 1 modified to include a diagnostic system.

FIG. 6 illustrates a modification of the disclosed power distribution system that includes a diagnostic system. It should be understood that this diagnostic system may be integrated into any embodiment of the present invention, for example an embodiment that includes extended storage switch 401.

In a preferred embodiment, diagnostic system 601 monitors each control circuit 101-107 to insure that when the corresponding control circuit switch 109-115 is closed, power is present in the corresponding control circuit. When a control circuit switch is closed, diagnostic system 601 also monitors the corresponding circuit after the corresponding fuse(s) 135-144, thus allowing the system to determine when a fuse is blown which prevents the coupled ECU from receiving power. Assuming that a fuse is not blown and that power is received by the corresponding ECU, then diagnostic system 601 preferably monitors for an acknowledgement message from the powered-up module. Preferably during a start-up sequence, controller 117 monitors each step of the start-up sequence for each control circuit, i.e., insures that power is available before and after the fuse, and that the module(s) for that circuit has started properly, before closing the control circuit switch for the next control circuit. Note that the system may be configured to supply the diagnostic information available from diagnostic system 601 to the user, for example on a user display screen integrated into the vehicle, or may only be available to a service technician.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A vehicle power control system, comprising:
    a power source;
    a plurality of control circuits;
    a plurality of electronic control units (ECUs), wherein each of said plurality of control circuits is coupled to at least one of said plurality of ECUs, and wherein each of said plurality of ECUs is electrically connected to at least one vehicle electrical component of a plurality of vehicle electrical components;
    a power distribution module coupled to said power source, said power distribution module comprising:
        a plurality of control circuit switches, wherein each of said plurality of control circuit switches is interposed between said power source and a corresponding control circuit of said plurality of control circuits, wherein each of said plurality of control circuit switches is adjustable between an open position in which said power source is electrically disconnected from said corresponding control circuit and a closed position in which said power source is electrically connected to said corresponding control circuit;
        a processor coupled to said plurality of control circuit switches, wherein said processor controls adjustment of each of said plurality of control circuit switches between said open and closed positions, wherein said processor is configured to adjust each of said plurality of control circuit switches between said open and closed positions based on a set of current vehicle conditions and in accordance with a set of preset switch activation instructions; and
        a plurality of sensors coupled to said processor, wherein said plurality of sensors are configured to monitor said set of current vehicle conditions; and
    an extended storage switch coupled to said power distribution module, wherein said extended storage switch is adjustable between a 'normal operation' position and an 'extended storage' position, wherein when said extended storage switch is in said 'normal operation' position said processor adjusts each of said plurality of control circuit switches between said open and closed positions based on said set of current vehicle conditions and in accordance with said set of preset switch activation instructions, and wherein when said extended storage switch is in said 'extended storage' position said processor is prevented from electrically connecting any of said plurality of control circuits to said power source.

2. The vehicle power control system of claim 1, wherein said extended storage switch disrupts power to said processor and prevents said processor from adjusting each of said plurality of control circuits switches based on said set of current vehicle conditions and in accordance with said set of preset switch activation instructions when said extended storage switch in said 'extended storage' position.

3. The vehicle power control system of claim 1, wherein said extended storage switch is comprised of an externally accessible mechanical switch.

4. The vehicle power control system of claim 1, further comprising a plurality of fuses, wherein at least one of said plurality of fuses is integrated into each of said plurality of control circuits.

5. The vehicle power control system of claim 4, wherein said at least one of said plurality of fuses is interposed between each of said plurality of control circuits and said corresponding ECU of said plurality of ECUs.

6. The vehicle power control system of claim 1, further comprising a vehicle power switch adjustable between an 'on' position and an 'off' position, wherein a status of said vehicle power switch is included in said set of current vehicle conditions monitored by said plurality of sensors, and wherein said processor is configured to close at least a subset of said plurality of control circuit switches in response to said status of said vehicle power switch shifting from said 'off' position to said 'on' position.

7. The vehicle power control system of claim 6, wherein said processor is configured to sequentially close said subset of said plurality of control circuit switches in response to said status of said vehicle power switch shifting from said 'off' position to said 'on' position.

8. The vehicle power control system of claim 1, wherein a first control circuit of said plurality of control circuits is electrically connected to a set of vehicle passenger safety systems, wherein said set of vehicle passenger safety systems further comprises an airbag control module, wherein said set of current vehicle conditions further comprises a current vehicle speed, wherein said plurality of sensors monitors said current vehicle speed, and wherein in response to said set of preset switch activation instructions said processor closes a first control circuit switch of said plurality of control circuit switches corresponding to said first control circuit when said current vehicle speed is greater than a preset value.

9. The vehicle power control system of claim 8, further comprising a vehicle power switch adjustable between an 'on' position and an 'off' position, wherein a status of said vehicle power switch is included in said set of current vehicle conditions monitored by said plurality of sensors, and wherein in response to said set of preset switch activation instructions said processor closes said first control circuit switch of said plurality of control circuit switches when said vehicle power switch shifts from said 'off' position to said 'on' position.

10. The vehicle power control system of claim 1, wherein a first control circuit of said plurality of control circuits is electrically connected to a set of vehicle lights and a set of door latches, wherein said set of current vehicle conditions further comprises a current vehicle fault status, wherein said plurality of sensors monitors said current vehicle fault status, wherein in response to said set of preset switch activation instructions said processor maintains a first control circuit switch corresponding to said first control circuit in a closed position unless a vehicle fault is detected by said plurality of sensors, wherein if a vehicle fault is detected by said plurality of sensors said processor opens said first control circuit switch in response to said set of preset switch activation instructions.

11. The vehicle power control system of claim 10, wherein a second control circuit of said plurality of control circuits is electrically connected to a primary DC/DC converter, wherein a third control circuit of said plurality of control circuits is electrically connected to a secondary DC/DC converter, wherein a second control circuit switch corresponds to said second control circuit, wherein a third control circuit switch corresponds to said third control circuit, wherein in response to said set of preset switch activation instructions said processor maintains said third control circuit switch in a closed position when said first control circuit switch is in a closed position, and wherein in response to said set of preset switch activation instructions said processor opens said third control circuit switch if said second control circuit switch is in a closed position when said first control circuit switch is in said closed position.

12. The vehicle power control system of claim 1, further comprising a vehicle power switch adjustable between an 'on' position and an 'off' position, wherein a status of said vehicle power switch is included in said set of current vehicle conditions monitored by said plurality of sensors, wherein a first control circuit of said plurality of control circuits is electrically connected to at least one vehicle propulsion system, wherein in response to said set of preset switch activation instructions said processor closes a first control circuit switch of said plurality of control circuit switches corresponding to said first control circuit when said vehicle power switch shifts from said 'off' position to said 'on' position, and wherein in response to said set of preset switch activation instructions said processor opens said first control circuit switch of said plurality of control circuit switches when said vehicle power switch shifts from said 'on' position to said 'off' position.

13. The vehicle power control system of claim 1, further comprising a vehicle power switch adjustable between an 'on' position and an 'off' position, wherein a status of said vehicle power switch is included in said set of current vehicle conditions monitored by said plurality of sensors, wherein a first control circuit of said plurality of control circuits is electrically connected to a set of passenger convenience systems, wherein said set of passenger convenience systems further comprises a passenger cabin HVAC module, a power window control module, and a vehicle entertainment module, wherein in response to said set of preset switch activation instructions said processor closes a first control circuit switch of said plurality of control circuit switches corresponding to said first control circuit when said vehicle power switch shifts from said 'off' position to said 'on' position, and wherein in response to said set of preset switch activation instructions said processor opens said first control circuit switch when said vehicle power switch shifts from said 'on' position to said 'off' position and after conclusion of a preset delay period.

14. The vehicle power control system of claim 13, wherein said preset delay period is settable by a user via a vehicle user interface.

15. The vehicle power control system of claim 13, wherein in response to said set of preset switch activation instructions after said vehicle power switch shifts from said 'on' position to said 'off' position and after a vehicle door is opened said preset delay period is terminated and said processor immediately opens said first control circuit switch.

16. The vehicle power control system of claim 1, further comprising a vehicle power switch adjustable between an 'on' position and an 'off' position, wherein a status of said vehicle power switch is included in said set of current vehicle conditions monitored by said plurality of sensors, wherein a first control circuit of said plurality of control circuits is electrically connected to a vehicle thermal management system, wherein in response to said set of preset switch activation instructions said processor closes a first control circuit switch of said plurality of control circuit switches corresponding to said first control circuit when said vehicle power switch shifts from said 'off' position to said 'on' position.

17. The vehicle power control system of claim 16, wherein said set of current vehicle conditions further comprises a current vehicle battery pack temperature, wherein said plurality of sensors monitors said current vehicle battery pack temperature, wherein said processor is configured to compare said current vehicle battery pack temperature to a preset temperature range, and wherein in response to said set of preset switch activation instructions said processor closes said first control circuit switch when said current vehicle battery pack temperature falls outside of said preset temperature range.

18. The vehicle power control system of claim 1, further comprising:
    a user interface mounted within a vehicle passenger cabin;
    wherein said plurality of sensors monitor current power usage per control circuit for said plurality of control circuits; and
    wherein said processor is configured to display on said user interface a representation of said current power usage per control circuit for said plurality of control circuits.

19. The vehicle power control system of claim 18, wherein said representation for each particular control circuit of said plurality of control circuits is displayed by said processor in terms of a percentage of a maximum usage limit for said particular control circuit.

20. The vehicle power control system of claim 18, wherein said representation for each particular control circuit of said plurality of control circuits is displayed by said processor in terms of actual power usage for said particular control circuit.

21. The vehicle power control system of claim 1, further comprising a diagnostic system coupled to said processor, wherein said diagnostic system monitors a current and a voltage at multiple locations within each particular control circuit of said plurality of control circuits, wherein said processor is configured to determine for each particular control circuit whether power is supplied to said ECU coupled to said particular control circuit when a particular control circuit switch corresponding to said particular control circuit is closed.

* * * * *